(12) United States Patent
Sehr

(10) Patent No.: US 6,325,292 B1
(45) Date of Patent: Dec. 4, 2001

(54) CARD SYSTEM AND METHODS UTILIZING COLLECTOR CARDS

(76) Inventor: Richard P. Sehr, 2276 Creek Bed Ct., Santa Clara, CA (US) 95054

(*) Notice: Subject to any disclaimer, the term of this patent is extended or adjusted under 35 U.S.C. 154(b) by 0 days.

(21) Appl. No.: 09/067,094

(22) Filed: Apr. 26, 1998

Related U.S. Application Data

(60) Provisional application No. 60/045,768, filed on May 6, 1997.

(51) Int. Cl.⁷ .................................................. G06K 19/06
(52) U.S. Cl. ........................... 235/492; 235/375; 235/487
(58) Field of Search ................................ 235/492, 380, 235/375, 387; 395/600

(56) References Cited

U.S. PATENT DOCUMENTS

| | | | |
|---|---|---|---|
| 4,752,676 | | 6/1988 | Leonard et al. ..................... 235/379 |
| 5,067,162 | | 11/1991 | Driscoll et al. ..................... 382/286 |
| 5,155,342 | | 10/1992 | Urano .................................. 235/380 |
| 5,264,689 | | 11/1993 | Maes et al. ......................... 235/492 |
| 5,287,269 | * | 2/1994 | Dorrough ............................ 364/408 |
| 5,287,641 | * | 2/1994 | Sedwers ............................... 40/488 |
| 5,302,811 | | 4/1994 | Fukatsu .............................. 235/381 |
| 5,411,259 | * | 5/1995 | Pearson ................................ 463/63 |
| 5,433,035 | * | 7/1995 | Bauer ................................. 40/124.1 |
| 5,522,590 | * | 6/1996 | Morran ............................. 273/244.2 |
| 5,542,709 | * | 8/1996 | Evans .................................... 283/61 |
| 5,566,327 | * | 10/1996 | Sahr .................................... 395/600 |
| 5,641,164 | * | 6/1997 | Doederlein et al. ................. 273/237 |
| 5,743,801 | * | 4/1998 | Welander ............................. 463/44 |
| 5,748,731 | * | 5/1998 | Shepherd ............................... 380/4 |

OTHER PUBLICATIONS

Anonymous, "New Services: Debit Card Rollercoaster Stops at Texas Instrument Park AstroWorld: Uses Financial Interchange/First City Bancorp POS Svc for Theme Park", EFT Report, Aug. 8, 1988, p. 8.

Joan H. Murphy, "Opryland: Security in Harmony", Security Management, vol. 33, No. 8, Aug., 1989, pp. 89–91.

Anonymous, "How Debit is Accepted in Some Amusing Ways", POS News, Jan. 1, 1992, pp. N/A.

Carl Shakford, "A Jungle Out There. (Anheuser Bush Theme Parks)(case study)", LAN Magazine, vol. 10, No. 7, pp. 127–131.

\* cited by examiner

*Primary Examiner*—Karl D. Frech

(57) ABSTRACT

A card system and methods that encompass a card issuer entity and a plurality of service providers so as to automatically compile, issue, utilize, and process collector cards for the purpose of enjoyment, purchase of goods and services, and for the activation of other card-based privileges. The portable collector cards are realized by smart card technology and have the ability to compile and process collectible information, and store and use a monetary amount to simulate debit/credit card payment means. Biometrics identification of cardholders, as well as cryptographic certification of collectible card data and related information, can optionally be encoded onto the cards and can be verified and validated at various point-of-service locations upon presentation of the card for utilization, including for manipulation of collectible information, rendering of card-based services, and for communications of card data and database information.

49 Claims, 2 Drawing Sheets

| COLLECTORS CARD | | | | |
|---|---|---|---|---|
| BUTTON | BUTTON | . . . | | BUTTON |

THEME - OVERVIEW

| Label | Box | | THEME - List & INSTRUCTION - Window |
|---|---|---|---|
| Label | Box | Box | |

SUBJECT/TOPIC - OPTIONS

| SELECTION / FEATURE | | BACKGROUND / STATISTICS | |
|---|---|---|---|
| ☐ Text/Logos | SCROLL | ☐ Data | DISPLAY |
| ☐ Video | | ☐ Information | |
| ☐ Audio | Window | ☐ Data | Window |
| ☐ Other | | ☐ Information | |

INSTRUCTION - Window

| ACCESS CONTROL | | CERTIFICATION | |
|---|---|---|---|
| CARD/SERVICE | COMMUNICATION | ISSUER | COLLECTOR |
| ☐ Type | ☐ Read/Write | ☐ Artwork/Item | ☐ Content/Element |
| ☐ Type | ☐ Send/Receive | ☐ Artwork/Item | ☐ Content/Element |

INSTRUCTION - Window

COPYRIGHT / PROTECTION
Notices, Disclaimers, Statements, etc.

FIG. 2

CARD SYSTEM AND METHODS UTILIZING COLLECTOR CARDS

This application claims the benefit of Provisional Patent Application Ser. No. 60/045,768, filed May 6, 1997.

BACKGROUND OF THE INVENTION

The system and methods are intended to be used throughout the consumer electronics and leisure & entertainment industries; including by an issuer entity, which distributes collector cards and collectible information; a service provider, which renders and facilitates a plurality of card-related products and services; and by a cardholder, who acquires and uses the collector card.

The system deploys a plurality of functional components and a set of computer programs to implement its operational tasks, including the communications of data and the usage of the collector card between and among the above system user.

The functional components encompass, for example, PCs or other computing platforms, communications terminals, card read/write devices and other data capture equipment, biometrics boxes and other computer peripherals, and the collector card. These components can be connected via a multi-directional communications link to allow the exchange of data/information between and among the systems entities including the cardholder. The system components are off-the-shelf hardware devices that can be purchased from retailers/computer stores, procured from component manufacturers or its distributors, or acquired from providers of networking/communications services. The communication links can be implemented via the Internet or any other commercial available, wirebased or wireless network technology.

The computer programs perform the house-keeping assignments, computing and decisioning functions, application-specific routines, and the communications/networking tasks necessary for the system's operations and card usage. These programs further include security means, such as cryptographic schemes, digital signatures and authenticity codes, to protect the system, cardholders and card contents against fraudulent use. The software programs reside within the system's components including the electronic collector card. In this way, a cardholder/system user can instruct the system to select and execute a plurality of computerized means or operational functions under the auspices of the software programs and the guidance of command buttons, template files and pull-up/pop-down menus embedded into the system or stored in the card.

The system further comprises a database scheme for storing a set of data and information in a distributed manner among a plurality of database components associated with the plurality of system users, including the collector card. The database scheme comprises means for automatically interchanging a selected number of data elements, from among said set of data/information, between and among all database components via the communication link whenever such data elements are inputted including modified by a particular system entity. In this way, the network of system database components, including the collector card per se, acts and behaves as a single integrated database that always contains and automatically delivers—anytime, anywhere—the most up to date set of those data and information.

SUMMARY OF THE INVENTION

Based upon the features and objectives of the system and methods, advantages of this invention include reduced administrative costs, improved productivity, better quality of service, and higher revenues associated with the issuance, usage, and enjoyment of the computerized collector cards as compared to the deployment of traditional paper/plastic-based cards.

The lower administrative costs are the result of less personnel needed for the automated issuance of cards as compared to controlling and following-up on paper/plastic-based media; of less resources and telecommunications costs required to authenticate the card data or to clear electronic payments as compared to verifying hardcopies or to settle traditional payments; and of reduced fraud facilitated via the card-based security features.

The increased productivity is the result of substituting time consuming, labor intensive, and error-prone manual operations—associated with traditional document utilization and conventional processing platforms—by the system's computerized means; as well as of streamlining repetitive tasks via electronic templates and automated communications exchange.

The improved quality of service—when using the computerized card—is the result of achieving faster service or improved throughput at the point-of-service, more service or product selections to choose from, up-to-date information available for micromarketing and inventory management purposes, and of the convenience associated with the rendering of services from remote locations.

Higher sales revenues will be achieved by allowing the cardholders to update collectible data after issuance and to subscribe to collectible topics made available via a set of cards, which will lead to more loyal collectors and increased spending habits. The card can also generate incremental sales revenues by renting out card-space to corporate sponsors, such as, for promotional programs or for co-branding schemes involving electronic payment means.

It is an objective of the present invention to provide a computerized system and methods for the issuance of collector cards, enjoyment and exchange of collectible information, and the rendering of other cardholder services.

It is further an objective of the invention to provide a portable card to store, process and communicate electronic templates representing collector cards and the like collectible data; as well as electronic payment forms representing monetary values.

It is further an objective of the invention to provide for a method of compiling the card data elements, which are also stored and maintained throughout a plurality of remote database components, and of issuing the card to a legitimate cardholder, which is entitled to use the card for a predetermined purpose.

It is further an objective of the invention to provide for a method of rendering via the collector card a plurality of value-added services as identified by the appropriate card-based service codes.

It is further an objective of the invention to provide for a method of protecting data and information stored in, or communicated between and among, the collector card and databases.

It is further an objective of the invention to provide for a method of using the collector card for remote services while coupling the card to remote databases for the purpose of communicating collectible data and related information.

It is further an objective of the invention to provide a portable card to update collectible data stored in a card or to assemble collectible information partitioned throughout a set of collector cards.

BRIEF DESCRIPTION OF THE DRAWINGS

FIG. 2 is a block diagram of one embodiment of the electronic collector card of the present invention.

DESCRIPTION OF A PREFERRED EMBODIMENT

Figure 1:
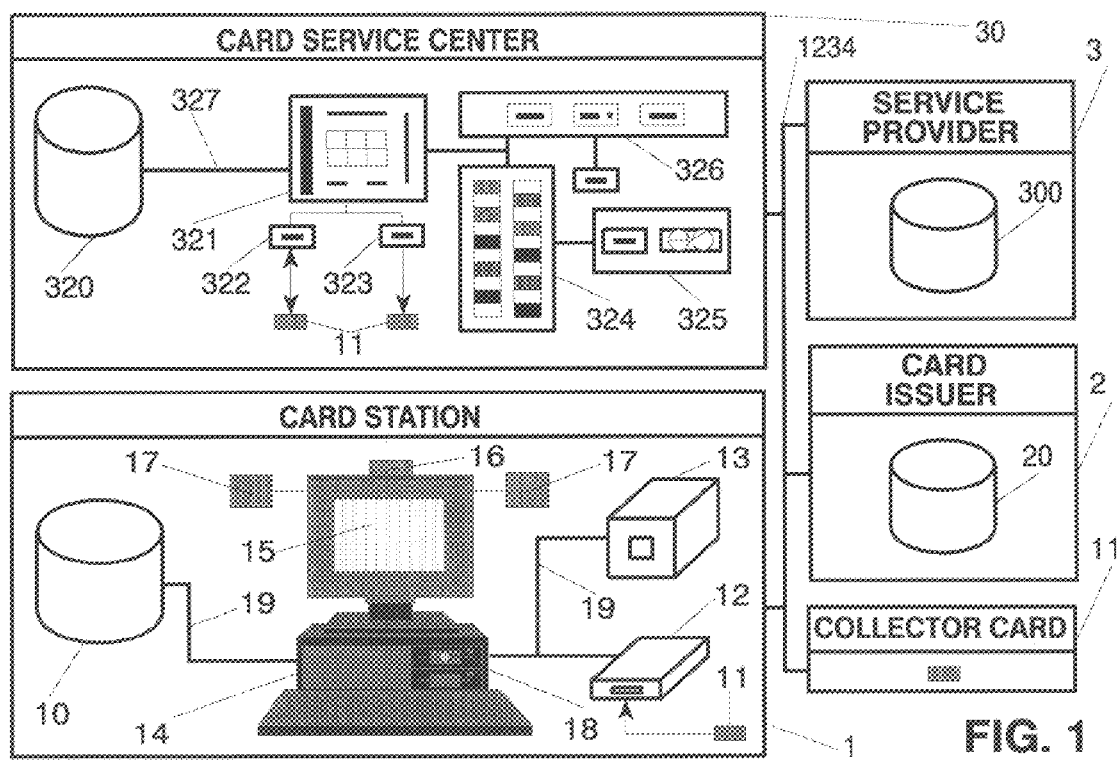
FIG. 1 is a block diagram illustrating one embodiment of an electronic card system, including the system's communication links and the structural components of a card service center and of a card station.

This invention relates to an automated card system and methods for facilitating via a portable collector card device a plurality of services, comprising storing collectible information, security data, and other information in the collector card; loading monetary values and electronic payment forms in the card; issuing and using the card for enjoyment and other services, and for purchases of goods and services; rendering the services requested and clearing the payments made via the card; and communicating card data and related service information between and among the system entities.

FIG. 1 depicts the functional components of a preferred system in accordance with the principles of the invention. The system and methods allow the issuance of a collector card to individuals for the purpose of enjoyment or other objectives, as well as for the electronic rendering of services. To implement the system's operational tasks, commercially available hardware components and various software programs will be employed. The hardware provides the computing infrastructure and the communication data links that integrate a plurality of remote system entities including the collector card into a network. The computer software packages perform house-keeping functions, application-specific routines, networking and communication procedures, and utility tasks. This software also includes security means, such as cryptographic software programs and authenticity files, to protect the system information and card contents against fraudulent use. The hardware and software are distributed throughout the system entities including the collector card.

The Card Station (1) provides the computerized means to be used by a card user for the remote communication with the system or for the local interaction with the collector card. For instance, the cardholder can exchange data with remote databases, as well as update or manipulate data stored in the card.

The Card Issuer (2) represents an entity that issues various collector cards while also providing a plurality of collectible information that can be stored in the cards. For instance, the issuing entity can provide a card, containing a collectible topic, that can be updated later on as information relating to the card-based topic changes.

The Service Provider (3) represents the entities that support the card's usage and the system's operations, as well as render a plurality of products and services to the cardholders. Such providers comprise, for example, Internet service or content providers that communicate database information with the collector card; a bank or financial institution that stores an electronic monetary value or other electronic payment means in the card; a transaction processor that clears and settles electronic payments made via the card; or a certification center that authenticates collectible data or cardholder information.

The Card Service Center (30) provides the computerized means to be employed by a cardholder when requesting a new card or the personalization of cards previously issued. For instance, a collector card can be selected from among a plurality of card configurations, or cardholders can input a particular data into the card or imprint a specific artwork onto the card.

The Collector Card (11) represents a portable platform that comprises means for processing, communicating and storing collectible data and other information.

The distributed databases (10), (20), (300) and (320) are associated with the plurality of remote system entities that comprise the card station, card issuer, service provider and card service center, respectively. The above database scheme comprises database storage means for storing data and information in a distributed manner between and among those remote entities including the portable collector card. The databases include the data records that relate to the entities and to the collector card contents. Further included is information including electronic template files, which implement the card's usage and the system's operations. Also stored is card data and system information to support the communications and data security management functions. As a function of the amount and complexity of the data to be stored, this database can be implemented via a variety of storage configurations. Solid state memory, magnetic tape, rotating media, video disks, and optical/laser media, are examples thereof.

A major feature of the system is that these remote distributed databases including the collector card per se, always contain the same set of data that is required to authenticate a collectible information, including to qualify a collector card for service. The availability of this most up-to-date data is guaranteed by the system's build-in mechanism of exchanging data in a real-time manner. In other words, if data changes or service/payment activities are performed by any one of the entities, all other entities including the collector card will be automatically receiving this new information. Such an incremental exchange is not only fast and reliable, but also cost effective because of significant lower communications expenditures. The collector card, which can act as a portable database and/or off-line processing unit, also will free the system from lengthy and costly on-line modus of operandi, including on-line verifications and authorizations, while providing the bridge for stand alone or incompatible systems configurations.

The CARD STATION employs a plurality of means to compile and authenticate the card contents, communicate data between the card and system entities, manipulate card data and update the system databases, and to exchange information with the card issuer, service provider, and card service center. These means comprise the database (10), collector card (11), card read/write device (12), biometrics box (13), computing platform (14), and various software programs to implement the application routines and network communication as instructed by the card station. These system components are connected via a communication link (19) to allow the exchange of data/information throughout the card station. These local components, including the card station per se, are also connected via a global communication link (1234) to the remote system components, including the card issuer and service providers. The global data link also allows the cardholder to communicate with the system entities via a personal computer or card terminal installed at remote locations, such as the cardholder's home, a business office, or public places.

The database (10) stores the data and information needed by the card station for the implementation of the operational functions and communications tasks. The database is linked to the other databases distributed among and between the plurality of operational entities—such as the card issuer, service provider, card service center and the cardholder— that are involved in the gathering, organizing, displaying, evaluating, manipulation, processing, and exchanging of data and information. In addition, this database is used for record-keeping, reporting, and inventory purposes. The database will also store an audit trail concerning the system's operations. This audit trail establishes the concept of non-repudiation with the help of a "Who did What-When-Where" recording; the recording is tamper-proof and non-erasable.

The database comprises data and information relating to the card station including to features and capabilities facilitated by the station, as well as to entities usinig including communicating with the station. For instance, the database data includes the name, mailing/business address, telephone number, and other data about the card issuer, service provider, card service center and cardholder. The information relating to the card station further includes a unique identification number, security keys and access codes for cryptographic purposes and protection schemes, account numbers with banks or other service providers, validation codes associated with products and services provided via the station, and certificates of authentication for the exchange of certified information with other system entities. The database data further includes cardholder lists comprising demographics data. Identification numbers and other cardholder information; lists of card issuers and service providers comprising their identification numbers and validation codes associated with the products and services rendered by those issuers and providers; and card authenticity files corresponding to card authenticity codes or identification numbers stored in the collector cards. Also included is information relating to the terms and conditions of service options available to the cardholders, to collectible information and other use rights stored in collector cards, and to transactions performed including an audit trail established via a collector card. This latter audit trail may include details about the collectibles stored in the card, services rendered, merchandise purchased, and the cardholder's collecting patterns.

The collector card (11) comprises a handheld card device that is used by the cardholder to store collectible information, request various services, and to pay for the purchase of goods and services. The collector card includes "smart cards" that have a shape similar to plastic bankcards, but with at least one silicon chip/integrated circuit embedded into the card package. Collector cards can further include PC (Personal Computer) card formats, handheld terminals or any pocket-sized computer configurations. The embedded circuits give the cards database storage means, processing capabilities and display means. The smart collector card can therefore input, store, process, output, and display data relating to collectible topics, cardholders, and system entities; as well as to services rendered via the card. The cards further can display data inputted into or retrieved from the collector card. The card data can be retrieved (read operation) from or loaded (write operation) into the card via a card read/write device or via traditional data input or retrieval means, such as a keyboard/mouse, pointing device, touch screen, or voice commands. This portable card can operate in a stand-alone or in an online modus of operandi.

The card read/write device (12) can read the collector card's contents as well as write information into the card; this read/write information can also be displayed onto the card reader. The card data can further be displayed and manipulated within the collector card or on the monitor of a computer terminal. The collector card can communicate, via such a read/write module, with the other system components including equipment that captures card data relating to text, graphics, audio or video information. This module can be a stand alone device, incorporated into computer terminals via appropriate plug-in boards, or implemented by the collector card via appropriate input/output ports.

The biometrics box (13) includes means for capturing and digitizing the biometrics characteristics information—such as fingerprints, voice, signature, eye characteristics, or picture/facial features—of a particular cardholder. The captured biometrics can be stored in or imprinted onto the collector card, as well as loaded into the database(s). Captured "live" biometrics can also be compared with biometrics information previously stored in the collector card or in a remote database, to verify if a cardholder is legitimate.

The computing platform (14) can be a multimedia personal computer—as indicated by the monitor/interactive display (15), video camera (16), loud speakers (17), and microphone module (18)—or any other computer configuration, such as application-specific computer terminals, general purpose personal computers, client/server networks, or mainframe-based computer environment. This computing platform performs the processing functions and facilitates the decision logic means required for the system's implementation and the card's usage. Such a computing platform can also be used by the cardholders to compile the card contents or request the rendering of services from remote locations (e.g. from their home or business premises). The monitor is used to display data and information that is entered or retrieved by a system user or exchanged with any of the system's databases including the collector card. The video camera captures fixed or moving images that will be exchanged with other system users, stored in the systems databases, including the collector card, or imprinted onto the collector card package. This camera can also be used to capture the biometrics data relating to the physical appearance of the cardholder or of a celebrity person. The loud speakers and microphone module represent means to exchange and capture audio data of users or sound information of other subjects under consideration.

The Communication Data Links can be implemented via any commercially available wired or wireless technology, such as cable/telephone lines, INTERNET service networks, or other digital or analog telecommunications media.

The CARD SERVICE CENTER provides the computerized means, including distributed database storage means, for loading various collectible data and related information into the collector card. This center also allows the cardholder to display the card contents, manipulate the data stored in a collector card, communicate with other system entities, and download a monetary value into the card. A collector can also select and purchase a predefined card configuration from among a set of available cards. Such service centers can be deployed locally or accessed remotely via the global data communication link as a virtual center.

The database (320) stores the data and information needed by the card service center to perform the operational tasks including data communications and security management. Such tasks comprise the storing and retrieving of card data, exchanging information between the collector card and the system entities, and protecting the card data and information communicated among and between the system entities. The database will also store an audit trail concerning the system's operations and the card's usage. This audit trail establishes the concept of non-repudiation with the help of a "who did what-when-where" recording; the recording is tamper-proof and non-erasable.

The database data comprises the identification number, security keys, and validation codes of the card service center. The identification number includes, for example, the location/address and business affiliation of the center. This unique identifier can also be used to certify a specific card data, so as to proof the authenticity of that data. The security keys and access codes are used to scramble information and to protect access to data. The validation codes are associated with the data loaded into the collector card, so as to proof the authenticity of the card data when presented by the cardholder later on for trade-in or consumption purposes. The database further comprises the identification numbers of the card issuer and the service providers; cardholder lists including the cardholder identification number, demographics data, and interaction records with the cardholder; negative files/hot lists with invalid account numbers or cardholders with past payment problems; card authenticity files corresponding to the card authenticity codes or identification numbers stored in the collector cards; and software card templates for the various card configurations; as well as information certified for exchange with other entities. Also included is information about the terms and conditions relating to card service options available to the cardholder, collectibles and use rights stored in the collector card, and to service transactions performed via the collector card. This latter transaction audit trail may include details about the services rendered, card products purchased, and the cardholder's purchase habits.

The user interface module (321) allows the cardholder to interact with the card service center while instructing the center, and system components linked thereto, to execute the arithmetic and logical functions required to compile the collector card contents and to implement the related computational, storage, and communications tasks. To select the instructions and to input data, various input means—such as a keyboard, pointing device, or voice commands—can be used. This module also displays via a display screen/monitor data inputted or retrieved by the cardholder, as well as information and feedback provided by the system entities.

The card slot (322) allows the cardholder to insert and remove the collector card for the purpose of loading data into the card, as well as retrieving, displaying and manipulating the card data. The card data can be selected on the monitor from among a menu of available data including information about collectible topics and other collector items. The card slot (323) provides the collector with a new card in response to the compilation of a blank card or to the selection of a predefined card type. This slot also can print-out, for example, a label/receipt with the selected data or provide a sticker showing the collectible information as a hardcopy version. The new card configuration can be compiled on the monitor and/or selected from the tray (324) that contains a plurality of card types including text, logos, audio and video data files, and artworks to choose from; these options/configurations can be loaded into as well as imprinted onto the card via the above card slot. This tray also contains a plurality of collectors cards the cardholder can choose from.

The multimedia module (325) establishes a bidirectional data communications link between the cardholder/collector and card service center for the purpose of exchanging data, text, graphics, audio and video information; as well as for capturing and forwarding such data and information throughout the system. This module can, for example, capture and verify biometrics characteristics of a cardholder, or facilitate an interactive dialogue between the cardholder and system administrator.

The banking module (326) allows the cardholder to pay for the collectible information or other services requested and loaded into the card, as well as for the new collector cards. The cardholder can select appropriate payment means from among a set of options including cash, checks, ATM or credit/debit banking cards, as well as the collector card per se. The banking module verifies the received payment data and related information for the purpose of authorizing and settling the appropriate payment options. This verification and clearing process can be accomplished via the collector card by deducting the monetary value (e.g. electronic cash or payment points) stored in the card, or via a network transaction processor by communicating with the banking module. The banking module also facilitates the loading of electronic payment forms including digital cash or payment points into the collector card; the stored electronic forms, cash, or points can be used to pay for the collectibles loaded into the card or for other purchases of goods and services. The cards or any other media representing a particular money equivalent, will be inserted into the banking module, so as to capture the information recorded or imprinted onto such media. This captured payment information will be used in conjunction with the selected payment means, as well as digitized and stored or reloaded into the collector card as a monetary value to be used for electronic payments.

The card service center's components are connected via a data communication link (327) to a local area network, as well via the global communication link (1234) to the remote system components including the card stations, card issuer and service provider.

FIG. 2 illustrates the functional structure of a collectors card, comprising a software file including an electronic card template that facilitates the computerized means for compiling the card contents and means for communicating data and information between and among the remote databases including the portable collectors card and the cardholder. The above means include the capturing, inputting, storing, retrieving, displaying, evaluating, computing, processing, and exchanging of data and information that are related to the theme(s) stored in, including featured via, the card and that are needed for the card's usage and system's operation. The card contents can also be manipulated, displayed, and exchanged via commercially available computer terminals, such as personal computers, POS terminals, or automated data collection and inputting devices. To safeguard the card contents and protect the data exchange, the card issuer, system entities or cardholder can load authenticity data and security information into the collectors card. To allow the communication between proprietary platforms, the card data and database information can be automatically translated or converted from a particular data format and contents into data/information with another format and contents. The collectors card comprises a plurality of fields, which are distributed between and among the card and/or system components, to facilitate the card-based functions and operational tasks of the system:

The BUTTON fields trigger and facilitate the storage, processing, and decision logic means required for the implementation of arithmetic and logic operations, as well as of the communications management functions. Such means retrieve and display, for example, the card data, edit the data, and store the edited data in the card or communicate it with the remote databases. Such means further compiles the card contents to represent a specific collectors item, including selects the topics and artwork to be stored in or imprinted onto the card, as well as downloads additional themes and subject matters into the collectors card. Such means further checks the validity and expiration dates of the benefits information and the collectors data stored in the card, verifies the authenticity of the card data, and determines if the collectors card should be approved or denied for additional services. When selected, these buttons display a set of pop-up or pull-down menus that aid the user in understanding the card's functionality and implementing the system's operation.

The THEME-OVERVIEW field includes the data and information that relates to the theme of the collectors card including the individual subject matter stored therein, as well as to the framework the collectors card can be used within. The stored card data comprises, for example, information—such as the title, identification number, certificate of authentication, security key, time frame, or references—about a particular subject matter. Also stored can be the demographics data including name, mailing address, birth date, identification number, certificate of authentication, and security key relating to an individual (e.g. athlete or actress) featured via the collectors card, as well as the cardholder's personal data including name, address, telephone, or identification number. Further stored can be the overall terms and conditions—such as the card issuer's guidelines and the cardholder's responsibilities— the collectors card has to conform to when being used. The stored overview information comprises plain data that can be displayed and modified by all card users; restricted information that can be manipulated including accessed only by an authorized entity including an cardholder; and certified data that can be retrieved and viewed, but changed only by the certification center or issuer of the collectors card. Also included in this field is the THEME-List/INSTRUCTION window that provides and displays a list of collectors items and topics stored in the card, as well as a set of help-functions to guide the cardholder through the steps of compiling and using the card data.

The SUBJECT/TOPIC OPTIONS field provides a plurality of features, which can be selected to compile or retrieve collectors card data, and the background and statistics about data and information, which can be stored or displayed. The SCROLL and DISPLAY windows allow the card holder to browse through the features and display the attributes associated therewith. For instance, the card user can use the scroll bars to locate a video clip associated with a particular topic or serial number, as well as use the display means to illustrate the statistical data relating to that clip. The INSTRUCTION-window guides the card user through the steps of selecting, displaying, compiling, and storing the above features and statistical information. The window provides and displays instructions that describe the choices available for a particular task, recommendations about how to proceed, and the outcomes associated with the implementation of that task or recommendation. The window also explains the status of what happened in response to a particular command or function being executed. This field also includes the selection and background sections.

The SELECTION/FEATURE section comprises the electronic representation of the features associated with a particular theme/item stored in the collectors card. These features can be stored in the collectors card by the card issuer including the promoter or underwriter of a collectors theme, as well as captured and inputted by the cardholder after the collectors card was issued. The features include text, graphics, audio, and video data that can be stored in the collectors card as an electronic, digital file and/or imprinted onto the card as an appropriate artwork. The storage or retrieval functions can be accomplished via the collectors card's computerized means including the card's input/output ports, or via a computer peripheral communicating with the card. For example, text and graphics can be entered directly into or retrieved from the card, as well as inputted via a card read/write device or scanner device. Audio or full-motion video can be captured via a microphone or camera, digitized, and loaded into the card via an audio/video port; the digital audio or video files can be forwarded and stored directly in the card or via a computer terminal including the card reader. Artwork can be imprinted, for example, onto the collectors card by a thermal printer after retrieving an appropriate card file or reading a file provided by a scanner. The features also include other capabilities, such as communication means to facilitate the exchange of the card data with remote databases or system entities. For example, the cardholder can download a specific computer file provided by a promotor of collectors cards and update the text and audio information previously stored in the card therewith. Or the cardholder can retrieve a static picture or full-motion video segment from a PC, TV set, or video-camera and store the retrieved information in the collectors card as well.

The BACKGROUND/STATISTICS section provides and displays onto the Status-window detailed information about the individual topics and features stored in or to be loaded into the collectors card. The Status-window also allows the card user to scroll through such information while displaying, for example, the personal data and physical characteristics of a football or baseball player including the number of touchdowns and batting average, the picture of a basketball player including the number of rebounds and a certified autograph, a video segment showing the U.S. women's soccer team winning the world cup championship, and an interview with a famous ice hockey player. Also displayed can be information about other subject matters including related artwork and statistical data. This window also allows the cardholder to modify or delete certain information and to reconfigure the background of a particular topic. The card-based data and information, including the features and topics stored in a collectors card, can be updated after the card is issued. In this way, the collectors card can comprise the most up-to-date features and topics relating to events and individuals as time goes by. Let's suppose that a collectors card was issued a few years ago, while featuring a rookie baseball player with the player's picture and Ist year batting average imprinted onto and stored in the card. Collectors who bought the card at the time of issuance, want now to update the collectors card to reflect the most current statistical data including picture of the baseball player; the batting average has improved and the player is now older and has a mustache. The collectors will communicate with the card issuer while requesting the player's new photo, pay for the service including use right, and download the picture into the collectors card. The picture can also be imprinted onto the card package, for instance, side-by-side with the younger photo. The collectors also retrieve the old statistical card data, update it with the current batting average, and store the new data in the card, as well as imprint the data onto the card, if applicable.

The ACCESS CONTROL field protects access to the collectors card contents and the service rights stored therein, as well as safeguards the communications flow between the card and the remote databases. The CARD/SERVICE control data comprises, for example, a PIN, biometrics information, or cryptographic keys and digital signatures to confirm the legitimate cardholder; authenticity codes to validate the card per se; and authorization levels with appropriate access codes to safeguard data stored in the card. If the data stored in the card matches data provided by the cardholder or correlates to information retrieved from the remote databases, access is allowed to the collectors card or permission granted to exchange information. The COMMUNICATION control data monitors and controls access to certain card data via appropriate access codes. Entities, including individuals, attempting to access (read) or manipulate (write) a particular data field/element, must be authorized to read data from or to write data into the card. Such an authorization may encompass, for example, the certification of the identification number or security keys of the entities, which want to read/write the card data, with the appropriate access codes to yield appropriate access rights for those entities. To facilitate a secure communications exchange throughout the card and between the card and the system entities, certain information including card data elements can be, for example, encrypted via a cryptographic key by the sender before being send to a particular receiver, and decrypted only via a cryptographic key of the receiver authorized to receive the message including the card data. The INSTRUCTION-window, incorporated into this data section, provides guidance and additional details about how to compile select, and use the card's security features.

The CERTIFICATION field allows the certification of information stored in the card by the card issuer or the card collector. The certificate of authentication, used by the issuers or cardholders, can comprise a security key, such as a digital signature, stored in the collectors card and attached to the topic to be authenticated or traded. Issuers or promoters of the collectors card can, for example, certify selected artworks and information such as a picture or signature, pertaining to a topic endorsed by them. A subject or topic certified via a security key by an endorser can comprise, for example, plain readable information relating to the subject matter and the endorser's identification number, and a digital certificate that can be unscrambled only by the security key of that endorser; thus proving that it is authentic. In addition, such certificates of authentication can also be communicated via appropriate security protocols between issuers and collectors. For example, when using the public key certification methodology, encrypting a certificate with the sender's secret key and with the receiver's public key and then communicating the encrypted certificate to the receiver, will guarantee that the certificate was actually forwarded by the sender and received by the receiver: the certificate can be decrypted only by the sender's public key and the receiver's secret key. Cardholders can, for example, certify certain data elements, such as background information or statistics data, pertaining to a subtopic stored in collectors cards they want to trade with another collector. Cardholders can also include one of their biometrics characteristics or any other unique cardholder-related information into such as a certification stamp.

The COPYRIGHT/PROTECTION field provides the disclaimer and notice to safeguard the intellectual property and use rights of the collectors card including the individual collectors topics stored therein.

The invention also includes a method of compiling the contents of the collector card and of issuing the card to a legitimate cardholder; the card contents comprising a set of data elements that are also stored and maintained throughout the remote system databases. The method includes the steps of verifying the identity of the cardholder, storing cardholder data and system entity information in the card, selecting and loading collectible information into the card, storing payment information and monetary values in the card, loading other cardholder entitlements into the card, authenticating data and information stored in the card, protecting access to card data, issuing the card to the legitimate cardholder, and establishing an appropriate audit trail.

The verification of the cardholder can be accomplished by checking conventional ID documents presented by the cardholder, verifying cardholder-related information stored in Government or public databases, or by providing security information that has to correspond to the security data stored in the card. If the verification process is successful, the cardholder is authorized to retrieve, manipulate, and store card data and related information; as well as use the collector card for the rights stored in the card. Updating collectible data previously stored in the card or receiving collectible information on a subscription-basis, are such rights. The card's authenticity can also be verified by checking the card authenticity code stored in the collector card, including by comparing the code against the authenticity file stored in the system database. If the code is valid including if there is a match, the collector card can be used; otherwise, card service is denied.

The data and information relating to the cardholder or system entities will be loaded into the collector card via the card's computerized input/output means including the card data templates or via a computer terminal including the read/write device and biometrics box. The cardholder data comprises demographics data, such as a cardholder ID number or SSN, and security information, such as a PIN, biometrics characteristics, or cryptographic keys. System information comprises data, such as identification numbers and security keys, about the entities that interact and communicate with a collector card. The card data can be inputted by a card user while being provided by the cardholder or captured from a media holding information to be stored in the card. The card data can also be downloaded from other system databases including transferred from another collector card.

The card-based collectibles will be stored as an electronic representation of collectible information. The card data can be displayed, checked for accuracy, or cancelled including replaced with new information. Such information can comprise fixed data or data that can be updated to always contain the most recent data relating to a particular collectible item. For instance, information relating to a particular athlete or sporting event can be modified so as to reflect the changing performance of that athlete or the additional information made available about that event. Collectible information stored in a particular card can also be transferred into another collector card without the need to communicate with a central database. In addition, once transferred, specific information can be automatically cancelled in that particular card, so that no more than one original collectible information will be in circulation.

To pay for the collectible information or the goods and services purchased by the cardholder, an appropriate monetary value will be loaded into the card. This value can be an electronic representation of traditional money including paper/plastic-based payment forms endorsed by banks, as well as electronic payment points underwritten by nonfinancial institutions including the card issuer or service provider. The information encoded on the banking payment forms can be scanned and digitized by a payment reader coupled to the collector card, or downloaded from the bank's database via the data communication link. The scanned or downloaded information is then stored in the card as an electronic payment form with a monetary value associated thereto. The payment points, which are sold or provided to the cardholder, can be loaded into the card via the card read/write device or via the data communication link directly from the database of the non-financial institution. The stored payment forms and related monetary values can also be displayed onto the card template, verified and updated, if necessary.

Besides the collectible information per se, other use rights or considerations can be compiled and loaded into the collector card as well. These use rights allow the cardholder not only to admire the collectible information, but also to enjoy additional features relating thereto. For example, in exchange for subscribing to a series of card issues, the cardholder has to right to purchase future collectible items at a reduced price. Or, in response to accumulating a predetermined amount of cardrelated consumptions, the cardholder might be considered for an upcoming sweepstake. The rights/considerations can be automatically loaded into the card during usage or selected from among a menu of choices offered to the cardholder by the card issuer or service provider.

To ensure the authenticity and integrity of card data, a set of related information is stored in the card and/or databases: authenticity codes to verify the collector cards, validation codes to electronically earmark goods and services including collector entitlements, identification numbers and certificates/digital signatures to authenticate the stored card data or information being communicated, and security keys to guarantee the data's integrity. This set of information, which is associated with the card including card data needing authentication, is tamper proof and can be loaded into the card only by the entity responsible to authenticate the data. If this information is scrambled including protected, it can be unlocked only by the authorized entity including proper keys or access codes. After successful unlocking, the authenticated card data will be retrieved from the collector card, or downloaded from a database, and displayed onto the card or computer terminal as legible data.

To protect selected access to the collector card, the cardholder or any other system entity can employ various protection schemes to safeguard the individual card data elements. For example, cardholders can input their PIN or biometrics information into the card, as well as scramble certain card data with appropriate security keys. System entities can, for example, control access to card data via predefined access codes or various security keys. Copyright statements and other notices can also be stored as a deterrent to illegal activities. To gain access to the card data, the appropriate codes or keys have to be provided by the entity attempting to do so. The provided information has to match, or correlate to, the one stored in the card. The same methodology applies to data that is protected and stored in a database; authorization to retrieve including download the database data is granted once the proper access information is provided.

Once the card contents is compiled, the card including data modified and stored therein can be used by the cardholder authorized to do so. The card will be issued to cardholders that have provided adequate payment including information identifying the cardholders and data validating the access rights. The issued cards can be used by one cardholder or by any other cardholder who is also authorized to access and use the card data.

The system databases including the collector card will also store an audit trail about the card['s] usage including the editing of card data and the communication of information between and among the remote databases and the collector card.

The invention also includes a method of compiling the contents of a collectors card comprising data and information relating to a theme represented by the card. The method includes the steps of authenticating the collectors card, loading terms and conditions into the card, selecting and storing theme-data in the card, personalizing the collectors card, certifying collectors data, promoting the collectors card, purchasing collectors cards, using and enjoying the collectors card, and establishing an appropriate audit trail.

The issuer of the collectors card can load into the card a unique identification number to authenticate collectors cards promoted including distributed by that issuer. The card can be authenticated afterwards by verifying the identification number stored in the card. For example, this number can be compared with a list of valid ID numbers that are stored in the issuer's database or provided via a public listing means. The number can also be compared against an authenticity code stored in any of the system databases. If there is a match or correlation, the card is indeed promoted by that issuer, otherwise the card is a fake. Both, the identification number and authentication code, are tamper proof data that cannot be duplicated by an unauthorized entity. The number and code can comprise plain or scrambled data; the authentication code can also be stored as an illegible information.

The card issuer can also store the terms and conditions relating to the collectors card, including the use of information stored therein. The terms/conditions outline the provisions of the card issuer including the rights and responsibilities conveyed to potential collectors. Tile issuer can, for example, decide which card data is allowed to be retrieved and viewed by the collector, and which data updated later on; this will be achieved by assigning a set of access control codes to that card data. The issuer can also allocate a pay-per-view clause to certain features stored in the card; such features can be viewed only if payment is provided in advance. The issuer can further define the steps required to verify the card's authenticity and to check the certificates stored in the card.

The collectors cards can come with a predefined set of features that have to be "enjoyed" as is or can be updated later on by the collector or issuer. The features can be selected from among a plurality of text and graphics, as well as audio and video information, that relate to the themes represented via the collectors card. The original theme-data can be inputted into the collectors card by the card issuer or authorized by the issuer and downloaded by the collector. The latter will be accomplished, for example, by communicating with the issuer's database, providing the required permission, and retrieving the data. Such data and information can be stored in and/or recorded or imprinted onto the card.

Based upon requests from collectors, the card issuer can personalize and configure the cards with special features and capabilities to fit the needs of the collectors. Such options will be stored in the card including attached to the corresponding subtopic upon proper payment is received from the collector. For example, a collector wants to subscribe to a collectors card featuring a baseball athlete, but with the option to update the batting average after every game played by that athlete down the road. In response, the card issuer will incorporate the appropriate feature into the card, so that the collector can access and update that statistical data. The issuer can also load cardholder data, or allow the collector to input such data, into the card. After the personalization is completed, the configured card can be issued to the collector, or the data options accessed by the cardholder and downloaded from the issuer's database.

The card issuer can certify the theme-data including individual features relating thereto via a digital certificate stored in the card. The certificate can comprise the issuer's unique identification code or security key that authenticates any data endorsed with that certificate. For example, a collector can verify if the background data about a sporting event is authentic by inputting the issuer's identification code; if there is a match, the background data can be viewed or retrieved. The collector can also check if a signature is actually provided by the athlete featured via the card by inputting the issuer's security key; if the keys correlate, the signature is authentic.

After successful compilation, the collectors cards can be sold including promoted to collectors. The cards can be marketed via retail outlets, mail order, or on-site locations by mobile vendors to the cardholders. Card issuers can also sell information to be loaded into a collectors card previously issued or to be stored in "blank" cards that are compiled from scratch. Instead of paying for a tangible collectors items, collectors will purchase this time the right to that information that can be downloaded into a collectors card. Subscriptions to features planned for release in the future or first right to purchase all issues of a limited edition, are such examples. In addition, collectors cards, including individual topics, can also be traded between collectors.

The collectors purchase the cards by providing appropriate payment, and positive identification, if applicable. The latter might be necessary if proof of age is required concerning cards to be sold only to adults. To pay for the card or individual features, collectors can use the monetary value including the electronic payment points stored in the card. Once payment is received, the issuer will compile an electronic receipt documenting the details of the purchase and store the receipt in the card and issuer's database. After payment is made, the issuers can be reimbursed by the bank or by the non-financial institution, respectively. To identify the collector, issuers can verify a traditional ID document presented by the buyer or retrieve the buyer's age from a collectors card containing the certified DOB (Date of Birth) data. If trading cards, collectors can also use individual features stored in the card to pay for a new card or for various features they want to acquire. In this case, the features used for trade-ins and stored in the buyer's card will be communicated to the seller's card.

After purchase, the collectors can enjoy the card contents including the features provided by the card. The contents can be displayed onto the card or any other computer screen; the card-based features can be viewed or listen to, as well as edited. Graphics imprinted onto the card can also be observed and studied. If pay-per-view features are stored in the card, the card will unlock those features only if so instructed by the issuer; for example, via a code downloaded into the card by the issuer's database after adequate payment was provided by the collector/viewer. The collector can also verify if the identification number stored in the card was tampered with. Let's assume that this number is protected via the issuer's security key. By inputting into the collectors card the correct key, the card number will be validated via an appropriate message. Otherwise, a warning about the number being fake will be conveyed. The collector can further verify any card data certified by the issuer, so as to make sure that the data is genuine.

The card issuer's database including the collector card will also store an audit trail about the compilation of theme-data, card-based payments including the related verification process, and about the data and information communicated between and among the remote system databases including the collectors card.

The invention further comprises a method for facilitating a plurality of value-added services to be rendered via the collector card. The method includes the steps of storing service codes in the card, protecting the service codes, requesting a particular service, verifying the particular service, determining the cardholder's service eligibility, rendering the services, and establishing and audit trail.

A set of service codes will be loaded into the collector card to qualify the cardholder for the plurality of services upon presentation of the card including communication with remote databases. The plurality of services includes services generated in conjunction with the card-based collectibles, provided on the premises where the card is issued, delivered via remote means, or facilitated as a combination thereof. For example, collectible related services comprise first right and other priority privileges to purchase additional collectible items including data about the same topic, automated selection of collectible cards based upon preferred configurations or budgetary price ranges stored in the card, accumulation of frequent purchase points, or a VIP-pass to meet the celebrity featured via the card. Remote services comprise inputting cardholder data and monetary values into the card, advanced card selections, performing electronic payments, loading collectible data including capabilities to edit the card-based data, on-line communications with remote databases including downloading of collectible information, ordering goods and services via the card, or subscription to a newsletter or other media containing information about card collectibles.

The service codes stored in the collector card will be protected by entities issuing the card or by service providers, so as to prevent the fraudulent use thereof. The codes can comprise plain text or scrambled data. For instance, the codes can comprise a unique identification number or security key of those entities or providers. The service codes will also be stored in the system databases the card is going to communicate with. As an additional safeguard means, the card containing the service codes, can also be protected via a tamper proof card identification number.

To request the rendering of a particular service, the cardholder will present the card to the service provider or log-on to the appropriate database. For example, the card will be inserted into a card reader or coupled to a provider database via the Internet network. At this time, the card can be authenticated by verifying the identification number stored therein. If the verification is successful, the card is authentic and authorization is granted to proceed therewith; otherwise no service will be provided via the card.

Upon presenting the card, the system will verify if the requested service can be provided via the card. For instance, the authenticity of a service code can be established by verifying the identification number or by attempting to unlock the code associated with the requested service. This can be done automatically via the card's computerized means including the communication means implemented between the card and system databases. If the process of verification or unscrambling is successful, for example, by providing the correct identification number or the correct key, the code is authentic and service can be provided; otherwise, no authorization will be granted to render the requested service.

To ensure that the cardholder is entitled to receive the requested service, the identity of the cardholder can be verified as well. For example, security information provided by the cardholder has to match or correlate to the security data stored in the card and/or system databases. If the verification including comparison is successful, the cardholder is authenticated and qualified to request and receive a particular service.

After verifying the service codes and qualifying the cardholder, services identified by those codes can be rendered to that cardholder. The card can now be used to receive the appropriate services facilitated via the card. For example, to order services and to purchase card products, pay for the services and goods via the collector card, communicate with the system databases, download data and information to be stored in the card, and to accumulate appropriate bonus points to be used for future services and card-related consumptions.

The service provider's database including the card will also store an audit trail about the storage of service codes, the card usage including the related verification process, and about the data and information communicated between and among the remote system databases including the card.

The invention further comprises a method of protecting data and information stored in the card and databases, as well as communicated between and among the card and databases. For instance, to guarantee a secure information exchange and to authenticate the card or system data, a cryptography scheme based, upon the public key technology can be implemented; all entities including individuals involved in the exchange or authentication of scrambled data will have an unique pair of keys, a public key known to everybody and a secret private key known only to a particular entity. The public key can include, for example, an unique mailing address or public telephone number, and the private key a secret combination of alphanumeric characters or a biometrics characteristics of an individual. In this way, a sender can communicate secure messages to a receiver while encrypting the messages with the public key of that receiver prior to transmission. The transmitted message can be decrypted only by the corresponding private key of the receiver (e.g. addressee); only the addressee on the envelop can open the envelop and read the letter. Besides, any information encrypted with the private key of a sender can be decrypted only by the corresponding (e.g. sender's) public key; the letter signed via the private key is therefore authentic and was send by that sender.

The public key technology, including the related security protocols employed for communications, can also be used to store a public key certificate in the collector card. The certificate is tamper proof, cannot be duplicated, and is used to certify or authenticate data and information it is associated with. For example, a particular certification center can load such a certificate into the collector card as a digital signature; the signature can be attached to a selected card data or associated with a particular information stored at a remote location. Afterwards, the digital signature provided by the collector card can be used to unlock or unscramble that certified data or information, so that the data/information can be retrieved or downloaded and displayed or printed-out in a plain or legible manner. The fact that the data/information could be accessed or unscrambled with the card-based certificate is proof that it was certified by that particular certification center; if access is denied, the certificate could be a fake or the data/information tampered with. The signature can also automatically "pop-up" when card data or remote information, which is certified via that signature, is retrieved and displayed. Once displayed, the signature can be compared against the official signature of the certification center; this can be done by uploading the signature to the center's database for comparison or by verifying the card-based signature against a list of valid signatures provided by that center. If the comparison/verification is successful, the signature is established to be valid, as well as the card data "signed" therewith to be certified. If scrambled, the signature can be verified by using the certification center's public key to unscramble it; if the signature cannot be deciphered via this public key, the data/information was not signed by that certification center.

The public key certificate can also be used to confirm the identities of cardholders and service providers involved in card-based transactions. To allow each party in a transaction to confirm the identity of the other, the electronic certificate stored in the collector card will be exchanged automatically with the digital certificate stored in the provider database. In this way, the certificates can authenticate off-line payment transactions, support on-line debit transactions, ensure that the communicated information including monetary values are not altered by an unauthorized entity before it is received by the provider, and proof that a cardholder has indeed initiated a purchase or information request and forwarded payment, as well as that a provider has received the payment and provided the product or service.

The collector cards can also be used for remote services, such as to communicate with the issuer's database for the purpose of downloading more data and information about collectible data or related information. For instance, data and information about sporting events, the latest news, or player information can be viewed, manipulated and/or stored via a computer terminal including the collector card. For example, the schedule of all home and out-of-town games can be retrieved, updated as the games are played, and loaded into the collector card. The schedule comprises the date, time and location the teams are playing at, the name of the team members and coaches, and a field for inputting the score and other game or player related statistics. The cardholder can also download or order other game statistics, player autographs, video clips from selected games, newsletters and brochures, interviews with sports officials, or other specific collectors items. If payment is required for the retrieval and usage of the database data, the cardholder can pay via the monetary value stored in the card.

A cardholder can also compile and/or update the collector card with respect to a particular theme. The themes relating to a collectors item can be featured via single topics, such as the autograph or picture of an individual player, or via a series of sub-topics, such as the set of picture segments that need to be combined to represent the entire team photo. The sub-topics can be provided as individual pieces being part of a whole or as a sequence of subjects that interrelate. In other words, collectors items can be downloaded including stored in or imprinted onto the card, as a stand alone item, a puzzle-like topic, or as a set of interrelating topics. For instance, somebody collecting pictures of individual soccer players has the least restrictions about what, when, and where to order and download such photos. On the other hand, a collector interested in the women's national soccer team photo, which is segmented and provided on a card-by card basis, has to collect all segments to compile the overall photo of the soccer team. Collectors of the complete set of features such as autographs, interviews, statistical data, video clips, or pictures about a particular soccer player, have to purchase all of those features as they are released or trade them with other collectors at their leisure. The above collectors items can be purchased and stored in or imprinted onto the card as is, or the collector can also combine or edit the individual features, so as to tell a story or update exiting data as time goes by. For example, a subscription to collectors card featuring the strikers with the most goals per season might illustrate the saga about the most effective forwards of all times. Statistical data or physical characteristics with respect to a player might change over time as well; this can be reflected via modifications made to the card data or by capturing and downloading a more current picture of the player.

The cardholder can further subscribe to collectors cards that need to be assembled on a puzzle to yield a particular theme. For example, a card issuer provides, in no particular order, a set of collectors card that have to be assembled side-by-side and end-to-end to feature the ambience of the final soccer match of the 1994 world cup championship. The themed soccer match will be illustrated via the artwork and related information, that is imprinted onto and/or stored in the individual collectors cards. The collectors cards can have a predefined shape such as a rectangular form, square, or with irregular contours. If delivered as an electronic card image, the image can have a predetermined characteristic surface configuration of the collectors card it portrays. To correctly represent the final assembly, the above physical or electronic outlines of the collectors cards have to make contact and fit exactly.

The card issuer also provides a grid the collectors cards have to be arranged onto to produce the specific layout representing the entourage of the final soccer match. The grid can comprise, for example, a physical fixture or an electronic format template that outlines the boundaries the collectors cards can be placed and exchanged within. The grid can also provide clues about, and confirmations or rejections of, selections made by the collector when trying to assemble the puzzle. For example, by answering correctly a trivia question associated with a collectors card, the grid will reveal the position the card should be inserted into. Trivia questions can be provided via, including retrieved from and displayed onto, the collectors cards or the grid fixture and grid templates. Answers can be provided by the cardholders, including inputted into the cards, and compared with information stored in the card or recorded onto the grid per se. The grid can also convey a "correct versus incorrect" message about a card selection that is made by determining, including by guessing via a trial-and-error methodology, the location the card needs to placed at. For collectors that don't want to or can't figure out how to arrange the cards, the grid can also display the final, assembled picture while indicating the locations the collectors cards should be placed at.

If properly assembled, the final picture will show the soccer field with the players, coaches and referees, as well as the bleachers with the soccer fans, mobile vendors and media personnel. To further test the ingenuity of the collectors, the players featured via the collectors cards have to be placed in a particular arrangement to reflect a specific game plan employed by both teams during that finals; for instance, to simulate the snap-shot that lead to the winning goal. Once the collectors cards are arranged in the order that matches that snap-shot, the grid will confirm the correct assembly. For example, the electronic grid template will read the serial numbers previously stored in the individual cards and compare the card numbers against the corresponding layout numbers provided by the template. These numbers are by default intelligible, so that collectors cannot read them when trying to assemble the puzzle. The numbers can also be made legible, so that card collectors can enlist their help during the assembly process. If the card numbers match the template numbers, the final soccer match is correctly represented by the collectors cards; a message about the assembly being correct, will be conveyed. If there is a discrepancy, a message about at least one collectors card being out-of-order will be conveyed; the collector needs to rearrange the collectors cards to yield matching numbers. The discrepancy message can flag the specific grid location where a collectors card is out-of-location, provide a hint about how many cards need to be rearranged, or just inform the collector that the present arrangement is not correct without providing any clues which card is misplaced. The artwork illustrated by the collectors cards can also be compared against the portrait, which is displayed onto a computer screen or printed-out as a hardcopy depicting the surroundings of the soccer match. In this way, collectors can decide by themselves if their assembled artwork matches the portrait.

The hints and clues provided for the assembly of the cards can be applied to also solve the soccer puzzle via a top-down methodology. For example, the portrait can be provided to the collectors as a collection of scrambled images than can be unscrambled, for instance, by providing the appropriate information or solving the trivia question associated with those cards. In response to the corresponding information or correct answers inputted into the portrait template comprising the images, the image corresponding to a particular card will be unscrambled and revealed to the collectors. The images can also be unscrambled by overlaying the corresponding cards thereunto, including by providing the correct card data that matches the image-related information or the card's electronic borders that fit the outline of the images, respectively.

The collectors cards and grids can be provided with various degrees of difficulties regarding the ease or complexity of assembly. For instance, placing rectangular cards onto a grid fixture is easier than assembling cards with irregular margins. In the same context, linking electronic outlines of card images with only a few contact points is less difficult than attempting to assembly images with irregular borders that have to completely interlock to make contact. To verify if the cards are assembled correctly, the collectors can compare the artwork represented by the cards against the "original" portrait; while rearranging the cards until the assembled card-based artwork matches the portrait. Or the electronic means provided by the cards and/or grid can determine automatically if the cards are in place; while verifying if the electronic card borders fit or if the positioning data provided by the card matches the layout coordinates provided by the grid. The assembly process further can be structured, so as to make the process more difficult as fewer cards are left for assembly, as well as to provide bonus points for cards being placed correctly with only a minimum number of attempts. The bonus points can than be traded-in for directions about where to place other cards or credited towards considerations or fees forfeited during futile placement attempts. The points can also be used to reduce the overall number of attempts or time period needed to assembly the portrait; the most efficient collector could qualify for a prize such as free collectors cards for another puzzle, or a cash refund.

I claim:

1. A method for utilizing a portable collector card; said method comprising the steps of:

storing in the card a collectible information about a collectible item; said collectible information comprising data about a celebrity;

subsequently conveying including retrieving said collectible information from said portable collector card;

said step of storing the information comprising the step of
earmarking the card-based information with a certificate of authenticity;
earmarking said collectible information with a security key to assure that only a legitimate cardholder can use the information stored in the card;
subsequently presenting the card for use of said collectible information;
requesting and providing a security information for accessing the card data; and
verifying including comparing the provided information against said security key stored in the card; and
if there is a match; then unlocking the card-based information for usage by said legitimate cardholder; and
otherwise, denying use of said collectible information by the cardholder; said security key comprising a biometrics characteristics information of said legitimate cardholder.

2. The method in claim 1 further including the step of communicating a collectible data element stored in a particular card to another collector card, including a remote database; said communicating step comprising the steps of:
coupling said particular card to said another collector card, including said remote database;
communicating said collectible data element by said particular card to the other card, including the database; and
storing the communicated data element into said another collector card including remote database.

3. The method in claim 1 further including the step of conveying the status of a particular collectible information stored in the card; said conveying step comprising the steps of:
selecting said particular collectible information from among a set of collectible data stored in the card; and
displaying the selected collectible information onto said portable collector card;
said step of selecting collectible information comprising the step of choosing a type of embodiment for said particular collectible information; said type of embodiment being selected from the group comprising text, graphics, video, audio-based information, or a combination thereof.

4. A method for altering a particular collectible data stored in a portable collector card by a particular card user; said altering step comprising the steps of:
storing in the card a collectible information about a collectible item; said collectible information comprising data about a celebrity;
subsequently conveying including retrieving said collectible information from said portable collector card;
said step of storing the information comprising the step of earmarking the card-based information with a certificate of authenticity;
comparing an information provided by said particular card user against an access code previously stored in the card and used to earmark the card-based collectible data; and
if there is a match or correlation, then allowing alteration of said particular collectible data by said particular card user; and
otherwise, denying alteration of the card-based collectible data by said particular card user;
said access code comprising a digital signature of said particular card user.

5. The method in claim 4 further including the step of communicating a collectible data element stored in a particular card to another collector card, including a remote database; said communicating step comprising the steps of:
coupling said particular card to said another collector card, including said remote database;
communicating said collectible data element by said particular card to the other card, including the database; and
storing the communicated data element into said another collector card including remote database.

6. The method in claim 4 further including the step of conveying the status of a particular collectible information stored in the card; said conveying step comprising the steps of:
selecting said particular collectible information from among a set of collectible data stored in the card; and
displaying the selected collectible information onto said portable collector card;
said step of selecting collectible information comprising the step of choosing a type of embodiment for said particular collectible information; said type of embodiment being selected from the group comprising text, graphics, video, audio-based information, or a combination thereof.

7. A portable collector card, comprising:
a memory for storing in the card a collectible information relating to a collectible item;
said collectible information comprising sports-related data;
input/output means for entering into or retrieving from the card said collectible information;
means for communicating data by the collector card with an entity including a remote database;
means for updating by the collector card data including said collectible information after being stored in the card;
a theme-overview data section for storing a card contents theme, comprising:
data about a particular collectible subject stored in the card;
identification information about said collectible item; and
personal data relating to a particular cardholder;
a theme-instruction window for displaying a list of collectible items stored in the card and a set of help-functions for providing guidance about how to use the card;
a topic-options data section for storing and processing a plurality of collectible topics, comprising:
a set of features available for selection including for compiling a collector card data;
background and statistical information about said collector card data;
a scroll-window for browsing through said set of features; and
an instruction-window for providing assistance about how to select, display, manipulate, and store said plurality of collectible topics;
a card security data section for storing card access rights and data communication safeguards, comprising:
cardholder authenticity information including a digital signature; and
card authorization levels comprising access rights for reading and/or writing card data, and means for encryption/decryption of information including card data; and a certification data section for storing a certificate of authenticity comprising:
    means for certifying via said certificate of authenticity at least a portion of said collectible information stored in the card; and
    means for communicating a particular certificate of authenticity between a card issuer and a card collector; said communication means comprising:
        encrypting said particular certificate of authenticity with said card issuer's secret key and said card collector's public key;
        communicating by said card issuer the encrypted certificate to said card collector;
        decrypting the communicated certificate via said card collector's secret key and said card issuer's public key; and
        in response to successfully decrypting the certificate, means for considering said particular certificate of authenticity as being genuine.

8. The card in claim 7, wherein said collectible information further comprising a biometrics characteristics including an autograph of a celebrity.

9. The card in claim 7, wherein said collectible information further comprising:
    artwork information imprinted onto the card; and
    a payment form including a monetary value, for the purchase of a particular collectible item; said monetary value being embedded in the card.

10. The card in claim 7, further including means for earmarking said collectible information with a certificate of authentication to assure that the information is authentic and traceable to a genuine provider of said collectible information; and
    means for verifying said certificate of authentication upon presentation of the card for use; and
        if the verification is successful, then means for indicating by the card that said collectible information is authentic and identified as pertaining to said genuine provider; and
        otherwise, means for indicating that the information is not authentic and not traceable to said genuine provider;
    said certificate of authenticity comprising said genuine provider's digital signature.

11. The card in claim 7, further including means for altering a particular collectible data stored in the card by a card user entity; said altering means comprising:
    means for unlocking an access code previously used to earmark card data allowable for alteration; said unlocking means comprising means for verifying information provided by said card user entity when attempting to unlock said access code; and
        if the provided information matches or correlates with the code, then means for allowing the alteration of said particular collectible data by said card user entity; and
        otherwise, means for denying access to, including alteration of, the earmarked data;
    said access code comprising a cryptographic key.

12. The card in claim 7, further including communication means for communicating card data with a remote database, said communication means comprising:
    means for coupling said portable collector card to said remote database;
    means for requesting by the card a database information to be downloaded into the card; and
    means for storing into the card said database information downloaded by the database.

13. The card in claim 12, wherein said communication means further comprising:
    means for selecting said database information from among a plurality of database information; and
    means for updating card data, previously stored in the card, by said database information;
    said selecting means comprising means for verifying if said portable collector card is authorized to select and download said database information.

14. The card in claim 7, wherein said collectible information comprising data pertaining to an aggregate topic partitioned throughout a set of cards; and
    means for compiling said collectible information stored throughout said set of cards so as to yield said aggregate topic;
    said compilation means comprising:
        means for retrieving the topic related card information from said set of cards; and
        means for determining by the card how to assemble the retrieved card information; and
            if the determining means is successful, then means for conveying including displaying the compiled aggregate onto the cards; and
            otherwise, means for denying the compilation of said aggregate topic.

15. The card in claim 14, wherein said determining means comprising:
    means for providing hints about how to proceed with a particular assembly of cards in response to providing a correct answer to a trivia question; said particular assembly comprising a process of arranging cards for yielding said aggregate topic via the unscrambling of a puzzle-like arrangement of said set of cards; and
    means for accumulating bonus points based upon meeting a predetermined parameter imposed by said process; said bonus points being exchangeable for clues about how to proceed with said particular assembly.

16. The card in claim 14, wherein said compilation means further comprising:
    means for verifying if a retrieved card data including said collectible information is genuine; and
        if the verification is successful, then means for facilitating the assembly of the genuine data; and
        otherwise, means for prohibiting the assembly of data that is not genuine;
    said retrieved data comprising a serial card number that matches a corresponding number included in said aggregate topic.

17. The card in claim 7 wherein said portable collector card is a smart card comprising said memory for storing said collectible information.

18. The card in claim 7 wherein said portable collector card is a pocket-sized computer.

19. A method for using a portable collector card, the method comprising the steps of:
    storing in said portable collector card an information relating to a collectible item;
    subsequently making available an additional information relating to said collectible item; and
    updating at least a portion of said information previously stored in the card with said additional information, such that a revised information about said collectible item is now stored in said portable card;

said information comprising a statistical data about achievements of an athlete;

said revised information comprising an updated version of said information including said statistical data previously stored in the card.

20. The method in claim 19 wherein said portable collector card is a smart card comprising a memory for storing said information and said additional information in the card.

21. The method in claim 19 wherein said portable collector card is a pocket-sized computer.

22. The method in claim 19 wherein said information stored in the card further comprising said athlete's physical appearance compiled at a particular moment; and wherein said additional information comprising said athlete's physical appearance compiled at a moment other then said particular moment.

23. The method in claim 22, further including the step of displaying both of said athlete's physical appearances, compiled at said particular moment and at said moment other then said particular moment, onto said portable collector card;

said athlete's physical appearances comprising pictures of said athlete taken at different points in time.

24. The method in claim 19, further comprising the steps of:

storing said additional information in a remote database;

subsequently coupling said portable card to said remote database and establishing a data communication link between the card and the database;

requesting by the card the downloading of said additional information; and in response to said requesting the downloading of information, automatically downloading by the database said additional information into the card;

said additional information comprising data that is different from said statistical data previously stored in the card.

25. The method in claim 24, including the steps of:

in response to subscribing to said downloading of said additional information, compiling an appropriate card use right;

storing by said remote database said appropriate card use right into said portable collector card; and applying the card-based use right towards future purchases of collectibles including subsequent releases of said additional information.

26. The method in claim 25 wherein said data communication link being implemented via the INTERNET.

27. The method in claim 24 wherein said additional information further comprising a set of collectable data made available by a promoter of said collectible item on a pay-per-download subscription basis.

28. A method for compiling a data contents of a portable collector card, the method comprising the steps of:

storing in a remote database a set of data relating to a particular collectible item;

subsequently coupling said portable card to said remote database for exchanging data between the database and the card;

automatically downloading by the database said set of data into the card;

storing said set of data as relating to said particular collectible item in said portable card;

earmarking by the card said set of data with a security key to assure that only a legitimate cardholder can use the information stored in the card;

subsequently presenting the card by a particular cardholder for use of said set of data;

requesting and providing a security information for accessing the card data; and automatically verifying including comparing by the card the provided information against said security key previously stored in the card; and if there is a match; then unlocking the card-based data for usage; and otherwise, denying use of said set of data by said particular cardholder;

said security key comprising a biometrics characteristics information of said legitimate cardholder;

said set of data comprising a personal data of an athlete.

29. The method in claim 28 wherein said portable collector card is a smart card comprising a memory for storing said set of data.

30. The method in claim 28 wherein said portable collector card is a pocket-sized computer.

31. The method in claim 28 wherein said personal data comprising a statistical data relating to said athlete.

32. The method in claim 31 wherein said statistical data comprising a batting average of a baseball player.

33. The method in claim 31 wherein said statistical data comprising a number of touchdowns made by a football player.

34. The method in claim 31 wherein said statistical data comprising a number of rebounds of a basketball player.

35. The method in claim 28 wherein said personal data further comprising a biometrics characteristics information relating to said athlete.

36. The method in claim 25 wherein said biometrics characteristics information comprising a picture of a soccer player.

37. The method in claim 35 wherein said biometrics characteristics information comprising a picture of a football player.

38. The method in claim 35 wherein said biometrics characteristics information comprising a picture of a baseball player.

39. The method in claim 28 wherein said personal data further comprising a video data file relating to said athlete.

40. The method in claim 39 wherein said video data file comprising a full-motion video segment showing a women's national soccer team.

41. The method in claim 28 wherein said personal data further comprising an audio data file relating to said athlete.

42. The method in claim 41 wherein said audio data file comprising an interview with an ice hockey player.

43. The method in claim 28, further including the step of displaying onto said portable collector card said set of data including an artwork relating to said particular collectible item.

44. A method for assembling a collectible topic partitioned throughout a plurality of collector cards, the method comprising the steps of:

storing a sub-set of data relating to said collectible topic in a collector card;

associating said collector card with a different collector card from among said plurality of collector cards;

establishing a data communication link between the two cards; and verifying by the cards if said sub-set of data interrelates with a different sub-set of data previously stored in said different collector card; and if there is an interrelationship, then considering the two card data sets as representing at least portion of said collectible topic; and otherwise, considering said different sub-set of data as not being part of said collectible topic;

said collectible topic comprising a sporting theme.

45. The method in claim 44, further including the steps of:

downloading said sub-set of data and said different sub-set of data onto a grid template representing an outline said collectible topic can be assembled within; and displaying onto said grid template said collectible topic in response to the sub-sets of card data being properly assembled.

46. The method in claim 45, further including the steps of:

positioning a particular collector card onto a particular location on said grid template;

establishing a data communication means between the card and a grid data previously stored in said particular location;

comparing a particular sub-set of data previously stored in the particular card with said grid data, and if there is a match, then conveying by the grid a message that said particular collector card, including said particular sub-set of data, is positioned correctly onto said particular location; and otherwise, conveying a message that said particular location is the incorrect location for having the card positioned onto.

47. The method in claim 45, further including the steps of:

requesting by said grid template a particular information to be downloaded into the grid via a particular card; and in response to the downloaded information, automatically revealing by the template a predetermined location said particular card should be positioned at, such that said collectible topic will be assembled properly.

48. The method in claim 45, further including the steps of:

requesting by a particular card a predefined information to be downloaded into the card;

downloading a particular data into the card;

comparing the downloaded data against said predefined information previously stored in said particular card; and if said particular data matches said predefined information, then in response to the downloaded information, automatically conveying by the card a particular location on said grid template said particular card should be positioned at; and otherwise, denying positioning information about said particular location.

49. The method in claim 45, further including the step of providing a hint by said grid template about how to assemble a particular card onto the grid, said hint providing step comprising:

establishing predefined grid-locations onto which said plurality of collector cards have to be assembled, such-that said collectible topic can be properly assembled via said plurality of collector cards;

assembling said particular card onto any one of said predefined locations;

determining if said particular card is properly assembled; and if the grid location is the wrong location, then conveying by the grid a message about how to proceed with the rest of assembly;

said message comprising a clue where said particular card should be assembled onto the grid; and otherwise, selectively providing a bonus point for having the card properly assembled;

said bonus point comprising a reward to be used towards future attempts of assembling other collector cards onto said grid template.

* * * * *